(12) United States Patent
Frischholz et al.

(10) Patent No.: US 10,586,098 B2
(45) Date of Patent: Mar. 10, 2020

(54) BIOMETRIC METHOD

(71) Applicant: BioID AG, Nürnberg (DE)

(72) Inventors: Robert Frischholz, Nürnberg (DE); Hagen Zurek, Nürnberg (DE)

(73) Assignee: BIOID AG, Nürnberg (DE)

( * ) Notice: Subject to any disclaimer, the term of this patent is extended or adjusted under 35 U.S.C. 154(b) by 233 days.

(21) Appl. No.: 15/786,706

(22) Filed: Oct. 18, 2017

(65) Prior Publication Data

US 2018/0144184 A1    May 24, 2018

(30) Foreign Application Priority Data

Nov. 24, 2016   (DE) .................. 10 2016 122 649

(51) Int. Cl.
  *G06K 9/00*   (2006.01)
  *G06K 9/62*   (2006.01)

(52) U.S. Cl.
  CPC ..... *G06K 9/00288* (2013.01); *G06K 9/00228* (2013.01); *G06K 9/00281* (2013.01); *G06K 9/00597* (2013.01); *G06K 9/6202* (2013.01); *G06K 9/629* (2013.01); *G06K 9/6255* (2013.01)

(58) Field of Classification Search
  CPC .......... G06K 9/00288; G06K 9/00228; G06K 9/00281; G06K 9/629; G06K 9/6255; G06K 9/6202; G06K 9/00597; G06K 9/00604; G06K 9/0061; G06K 9/00221
  See application file for complete search history.

(56) References Cited

U.S. PATENT DOCUMENTS

| | | | |
|---|---|---|---|
| 6,792,707 B1* | 9/2004 | Setteducati | G09F 19/14 359/831 |
| 2003/0063796 A1* | 4/2003 | Gutta | G06K 9/00288 382/159 |
| 2003/0072031 A1* | 4/2003 | Kuwata | H04N 1/00137 358/1.15 |
| 2003/0223623 A1 | 12/2003 | Gutta et al. | |
| 2004/0197013 A1* | 10/2004 | Kamei | G06K 9/00268 382/118 |
| 2010/0053362 A1* | 3/2010 | Nanu | G06K 9/00248 348/222.1 |
| 2013/0070115 A1* | 3/2013 | Yang | G06K 9/00221 348/222.1 |

(Continued)

OTHER PUBLICATIONS

Uzair, Muhammad et al., "Periocular Biometric Recognition using Image Sets", IEEE, 2013, pp. 246-251.*

(Continued)

*Primary Examiner* — Samir A Ahmed
(74) *Attorney, Agent, or Firm* — Michael E. Dockins; Shumaker, Loop & Kendrick, LLP

(57) ABSTRACT

The method according to the invention is based on a first image of a first eye region of a person and a second image of a second eye region of the person, wherein the first eye region contains one of the eyes of the person, for example the right eye, and the second eye region contains the other eye of the person, for example the left eye; one of the images is mirrored, and the mirrored and the non-mirrored image are combined in the position space and/or in the feature space, in order to generate a template of an overlaid image. The template contains biometric features for person recognition.

19 Claims, 4 Drawing Sheets

(56) References Cited

U.S. PATENT DOCUMENTS

2013/0101182 A1* 4/2013 Frischholz ......... G06K 9/00899
                                                    382/118
2017/0279799 A1* 9/2017 Baltzer ............... H04L 63/0861

OTHER PUBLICATIONS

Fernando Alonso-Fernandez et al., "Comparison and Fusion of Multiple Iris and Periocular Matchers Using Near-Infrared and Visible Images", IEE, 2015, pp. 1-6.*

"Feature and Score Fusion Based Multiple Classifier Selection for Iris Recognition" Md. Rabiul Islam. Hindawi Publishing Corporation, Computational Intelligence and Neuroscience, vol. 2014, Article ID 380585, 11 pages, all.

"Periocular region-based person identification in the visible, infrared and hyperspectral imagery" Muhammad Uzair*, Arif Mahmood, Ajmal Mian, Chris McDonald. Neurocomputing 149 (2015) 854-867.

* cited by examiner

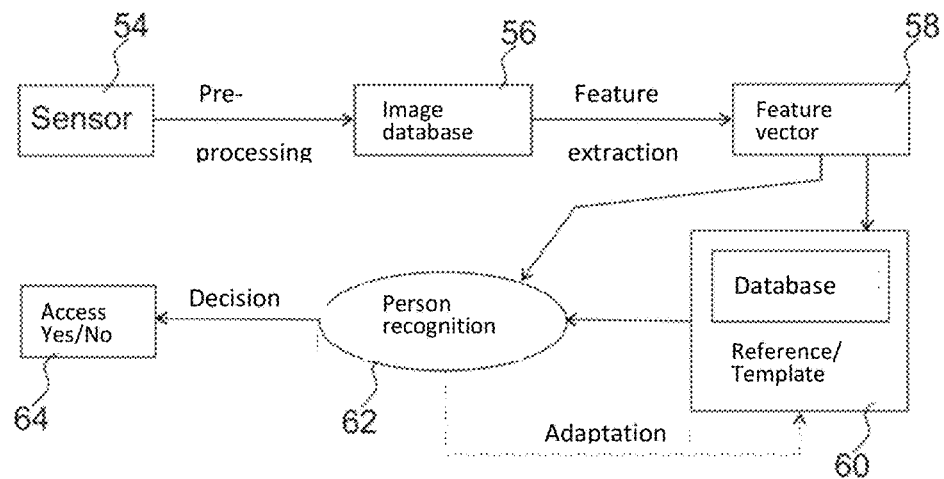
Fig. 4
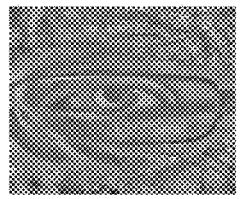 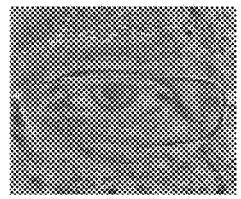 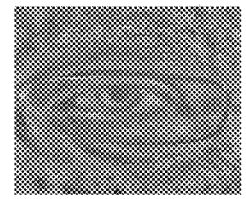
Fig. 5A  Fig. 5B  Fig. 5C
  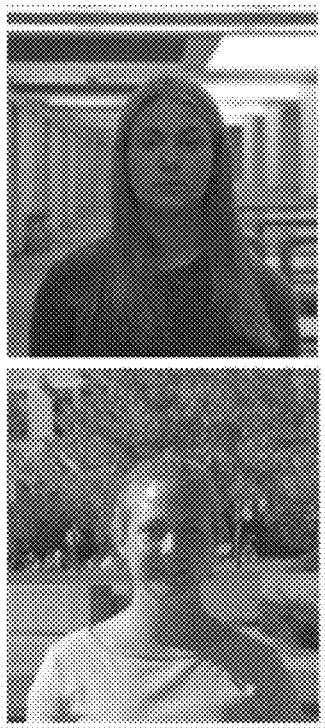
Fig. 6  Good  Bad  Ugly

BIOMETRIC METHOD

FIELD

The invention relates to a method for generating biometric data for person recognition on the basis of the eye region of the person.

BACKGROUND

The biometric identification of persons on the basis of facial recognition is known. Digital pictures of a face can for example be compared with reference photographs of the face, which have been taken e.g. in accordance with the ICAO (International Civil Aviation Organization) according to the biometric standard ICAO 9303 (Photograph Guideline). Person recognition on the basis of non-normalized images is becoming increasingly widespread. The comparison between digital pictures and photos is undertaken routinely e.g. at many border stations. It is also possible to compare the digital picture of a person with a picture of the same person stored in a database, in order to allow this person access to systems, computers, applications on the Internet and the like. A method for biometric person recognition is for example described in DE 198 47 261 A1. Biometric person recognition methods are considered to be particularly reliable, because they use person-specific features.

In the relatively recent past, person recognition methods were developed, which are not based on the recognition of the features of an entire face, but rather only take account of the eye region of the persons. The use of the eye region (periocular region) for person recognition often leads to good results, because shiny surfaces usually occur less in this region of the face, unlike in the case of the forehead, cheeks and nose, for example. A comprehensive investigation of the performance of recognition methods based on the entire face and on the basis of the eye region was carried out by Dr. P. Jonathan Phillips at the National Institute of Standards and Technology, NIST. The results are presented at https://www.nist.gov/programs-projects/face-and-ocular-challenge-series-focs and show that the recognition rate is very dependent on the lighting conditions of the face and on the consistency of the facial expression. To this end, a so-called Good, Bad and Ugly (GBU) test was developed, which compares the recognition rate for good, moderate and poor image pairs (reference image and current image). The person recognition test parameters were set in such a manner in the test that the false acceptance rate or FAR (also false accept rate) was 0.001 using a given recognition method.

The FAR describes the likelihood or relative frequency, with which a person is recognized, although this is not the correct person. The FAR is generally considered to be the most important criterion for the quality of a biometric recognition method. An FAR of 0.001 means that in a statistical average of 1000 unauthorized access attempts, one will lead to success.

The investigations of Phillips have shown that even the best person recognition methods, which use facial recognition, at an FAR of 0.001 have a positive recognition rate of 0.98 in good lighting conditions and a good matching of the image pairs (Good), of 0.80 in moderate lighting conditions and moderate matching of the image pairs (Bad) and of 0.15 in poor lighting conditions and a poor matching of the image pairs (Ugly). In the scope of this test, the performance of the person recognition is also investigated on the basis of only the eye region (periocular recognition). The recognition rates were considerably poorer and lay in the order of magnitude of 47%, 17% and 5% for the test scenarios Good, Bad and Ugly. For person recognition on the basis of the eye region, particularly in the case of moderate and poor conditions, there is therefore room for improvement.

The invention is directed at a method for person recognition, which achieves better recognition rates than the prior art, such as in the case of moderate and poor lighting conditions.

SUMMARY

The method according to one aspect is based on a first image of a first eye region of a person and a second image of a second eye region of the person, wherein the first eye region contains one of the eyes of the person, for example the right eye, and the second eye region contains the other eye of the person, for example the left eye; one of the images is mirrored, and the mirrored and the non-mirrored image are combined in the position space and/or in the feature space, in order to generate a template of an overlaid image. The template contains biometric features for person recognition.

The template can be created, in that the non-mirrored first image and the mirrored second image are overlaid, in order to create an overlaid image in the position space, and in that the overlaid image is subjected to a feature extraction, in order to create a first template feature group for person recognition in the feature space. Alternatively or additionally, the non-mirrored first image and the mirrored second image can be processed by feature extraction, in order to create a first feature group and a second feature group for person recognition in the feature space; and the first feature group and the second feature group are combined for creating a second template feature group for person recognition in the feature space. The first template feature group and the second template feature group can further be combined to form a third template feature group.

The overlaid image can for example be created by forming the averages of the pixels of the individual images. The feature groups can also be combined by means of averaging.

By means of the mirroring of one of the eyes and the subsequent overlaying of the mirrored and the non-mirrored image, whether in the feature space or in the position space, a more robust template for person recognition can be created than in the case of the individual consideration of the two eyes. The recognition rates can be increased, in the case of otherwise unchanged conditions, compared to a test scenario, in which the two eye regions are considered separately and without mirroring. This applies in particular for the case that the overlaid image and the two individual images of the eyes are analysed. It has been shown that the overlaid image is not redundant compared to the two individual images, rather its consideration increases the recognition rate.

Furthermore, by mirroring one of the eyes and analysing the overlaid image, problems can be avoided, which result from the fact that in practice it is not always known whether the imaging of a face is a mirrored version of the face or not. For example, some webcams create mirrored pictures. If the mirroring is not known in the case of such a picture, the person recognition system does not know whether it should compare the left eye in the picture with the left eye of a saved template or whether it should compare a mirrored version with the right eye. This problem is solved because a single template is created from the two images of the two eye regions, which represents an overlay of both eyes, which is independent of mirroring.

The images can be processed before the mirroring, in order to create sections, which are the same size, of the eye regions which contain the one or the other eye of the person in each case. For example, a photograph of the face or a part of the face of the person can be used as a basis, in which the eyes and/or the irises of the person are localized, wherein partial sections, which are the same size, of the left eye region and the right eye region are formed around the irises, which are then used as first image and as second image.

For further processing, the images can in each case be divided into N partial images, for example into 3×3 or 5×5 or 9×9 partial images or fields.

So as not to create any distortion by combining the two images, at least one of the images can be displaced before the combination, so that a defined point of each eye region lies in each of the images on the same relative position. Also, both images can be displaced relatively to the fields, into which each image is divided.

Before the displacement, displacement vectors of the N partial images of one of the images relative to the other of the images can be calculated, for example by means of cross-correlation or by means of an SSD algorithm.

Non-patent literature 1: Bruce D. Lucas et al. described in "An Iterative Image Registration Technique with an Application to Stereo Vision", Proceedings of Imaging Understanding Workshop, 1981, a method for localizing a template G(x) within an image F(x) using the L1 standard and the L2 standard and explain various correlation techniques, including the sequential similarity detection algorithm (SSD algorithm).

Non-patent literature 2: Optical correlation methods which can be used are also explained in the dissertation of the inventor: R. Frischholz, "Beiträge zur Automatischen Dreidimensionalen Bewegungsanalyse" [Contributions to automatic three-dimensional movement analysis] (ISBN3-8265-3733-5), dissertation, Shaker Verlag, 1998. Reference is explicitly made to the non-patent literature 1 and 2, particularly to the explanations of the optical correlation methods therein.

Before the combination, the images can be normalized or matched or equalized with regards to the brightness thereof. The overlaid image can be created by forming the average of the pixels of the overlaid individual images.

The images may be grayscale images. They can be stored as virtually any desired image file, preferably in a format compressed in a lossless manner, such as PNG.

The feature groups for person recognition can for example be created by processing the overlaid image or the individual images for example using Gabor wavelets or by extracting local binary patterns. A plurality of features of the overlaid image can be extracted, in order to create a feature vector or a feature matrix of the respective images.

The use of Gabor wavelets for feature extraction is for example described in non-patent literature 3: "Face Recognition Using Independent Gabor Wavelet Features", Chengjun Liu, Harry Wechsler; AVBPA '01 Proceedings of the Third International Conference on Audio- and Video-Based Biometric Person Authentication, pages 20-25, Springer-Verlag London, UK ©2001, ISBN:3-540-42216-1. This is a method for local transformation of signals from the spatial domain into the frequency domain. Liu and Wechsler have shown that good recognition rates can be achieved if Gabor filters with 5 different scales and 8 different orientations are applied for each relevant position. Reference is explicitly made to the non-patent literature 3, particularly to the explanations of the feature extraction therein.

The features in the first image, the second image and in the overlaid image are extracted for all images at the same positions.

The first template feature group, the second template feature group and/or the third template feature group can be processed for person recognition in a classification algorithm, in order to recognize a person, the features thereof are stored in a database.

SHORT DESCRIPTION OF DRAWINGS

Examples are explained in the following with reference to the drawings. In the figures:

FIG. 4 shows a schematic illustration of a system for biometric person recognition according to an example;

FIGS. 5A to 5C show examples of images of the left eye region and the right eye region of a person and an overlaid image;

FIG. 6 shows example images for explaining a GBU test.

DETAILED DESCRIPTION

Figure 1:
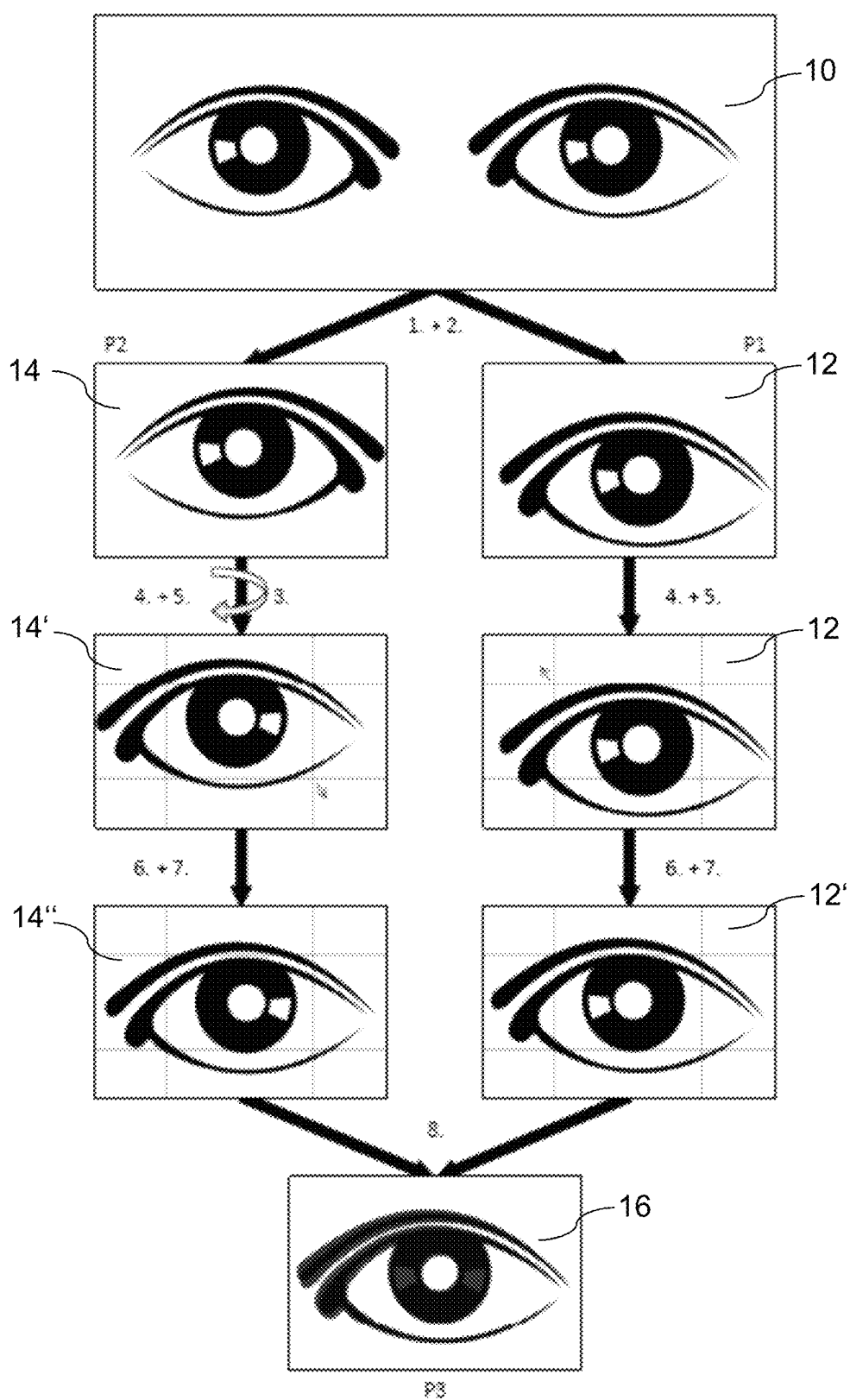
FIG. 1 shows a schematic illustration of various stages of an example of a biometric method.

FIG. 1 schematically shows various stages of an example of a method for creating biometric data for person recognition. The procedure of the method is also explained with reference to FIG. 2. In the example, a picture 10 of the face of a person is taken, at 20, which contains the eyes of the person in any case. This can be done using a digital camera, such as the camera of a smart device, a surveillance camera, a webcam or similar. The picture is transmitted to a computing device, for example a PC, a workstation or a distributed computing environment, and stored e.g. as a PNG file or TIFF file, BMP file or the like. The further processing of the picture can take place on the basis for example of the PNG format in the computing device, without limitation thereto. The eyes are localized in the picture 10, at 22, in that e.g. the irises or a different feature is found, wherein methods for localizing eyes are known in principle; cf. e.g. DE 198 47 261 A1.

At 24, partial sections of the picture 10 having the same size are formed around the left and the right eye, in order to create a first image 12 of a first eye region, which e.g. contains the left eye, and a second image 14 of the second eye region, which e.g. contains the right eye. The images can furthermore be present as PNG files. The partial sections are chosen in such a manner that they to the greatest extent possible in each case contain the entire eye and characteristic features around the eye, such as e.g. the eyelid. Each image can for example have a resolution of approximately 3000×2000 pixels. Grayscale images are preferably processed.

One of the two images 12, 14, in the example, the image 14 of the right eye, is mirrored at 26, in order to create a mirrored image 14'.

Before or after the mirroring, the two images 12, 14 or 14' can be normalized or equalized with regards to the brightness thereof, wherein this step 28 does not necessarily have to be performed in this sequence. For the normalization, e.g. for each of the two images, an average of the brightness thereof is determined, and the brightness of the two images is manipulated in such a manner that the same have the same or a similar average brightness and/or the same or similar variance. Additionally or alternatively, the images can be preprocessed in such a manner that the minimum and maximum brightness values thereof are compared. In the case of a Min/Max normalization for example, the smallest and the largest brightness value occurring is determined in each case. Each pixel is normalized separately, in that the minimum is subtracted and then multiplied by 255/(Maximum−Minimum). Thus, each image uses the entire grayscale range of [0 . . . 255]. This processing step is used to adapt the lighting conditions of the two images 12, 14 or 14' to one another as much as possible.

The image 12 of the left eye and the mirrored image 14' of the right eye are divided into N fields, at 30, 3×3 fields in the example shown, wherein each field contains a partial image and the fields can have the same size or different sizes. The division of the images into a plurality of fields can be used to determine an offset of the respective eyes inside the images thereof. In the example of FIG. 1, the middle one of the 3×3 fields in each case has a height and a width corresponding to half of the height and half of the width of the image 12 or 14'. If the height of the images 12, 14' is H and the width of the images 12, 14' is B, then the height of the middle field is therefore H/2 and the width thereof is B/2. The corners of the middle field are at a distance of H/4 and B/4 from the corners of the corresponding image in each case. These middle fields are called upon in the example of FIG. 1, to determine a possible displacement of the left eye with respect to the right eye inside the respective images 12, 14' thereof, at 32.

The displacement vector of the respective partial image or field from image 12 to image 14' can be determined e.g. by cross-correlation or by means of an SSD algorithm. Such algorithms are known in principle and described for example in non-patent literature 1 and 2, to which reference is made. The displacement vector can relate to a total displacement of one of the eyes relative to the other eye inside the entire image 12, 14' or inside a partial image or a plurality of partial images; or the displacement vector can image individual parts of the one eye relative to the other eye, for example in the manner of an optical flow method, which, for each image element, derives a displacement vector or flow vector and therefrom derives a displacement vector field or flow vector field. The theory on which the optical flow methods is based is described in DE 10 2011 054 658 A1. Reference is made to this document in relation to the explanation of the optical flow methods and the derivation of a displacement vector field. In this respect, its content is included by reference in this application.

After determining a displacement vector or a displacement vector field between the left eye and the right eye, the first image 12 and the second, mirrored image 14' are displaced in such a manner, at 34, that they are congruent or substantially congruent. To this end, each of the N fields can in each case be displaced by half of the displacement vector, or the displacement vector field, in the direction opposite thereto, in order to compensate the offset of the two eyes in the images 12, 14'. In this example, each of the N fields of the first image 12 is displaced in the opposite direction by half of the displacement vector; and likewise, each of the N fields of the second image 14' is displaced in the opposite direction by half of the displacement vector. The corrected images 12' and 14" result therefrom, in which the two eyes are arranged in such a manner that in each case, the iris lies in the centre of the middle field. In this stage, the preprocessing of the images is finished, and the non-mirrored first image 12 and the mirrored image 14' can be combined in the position space and/or feature space, in order to create a template for person recognition.

Figure 2:
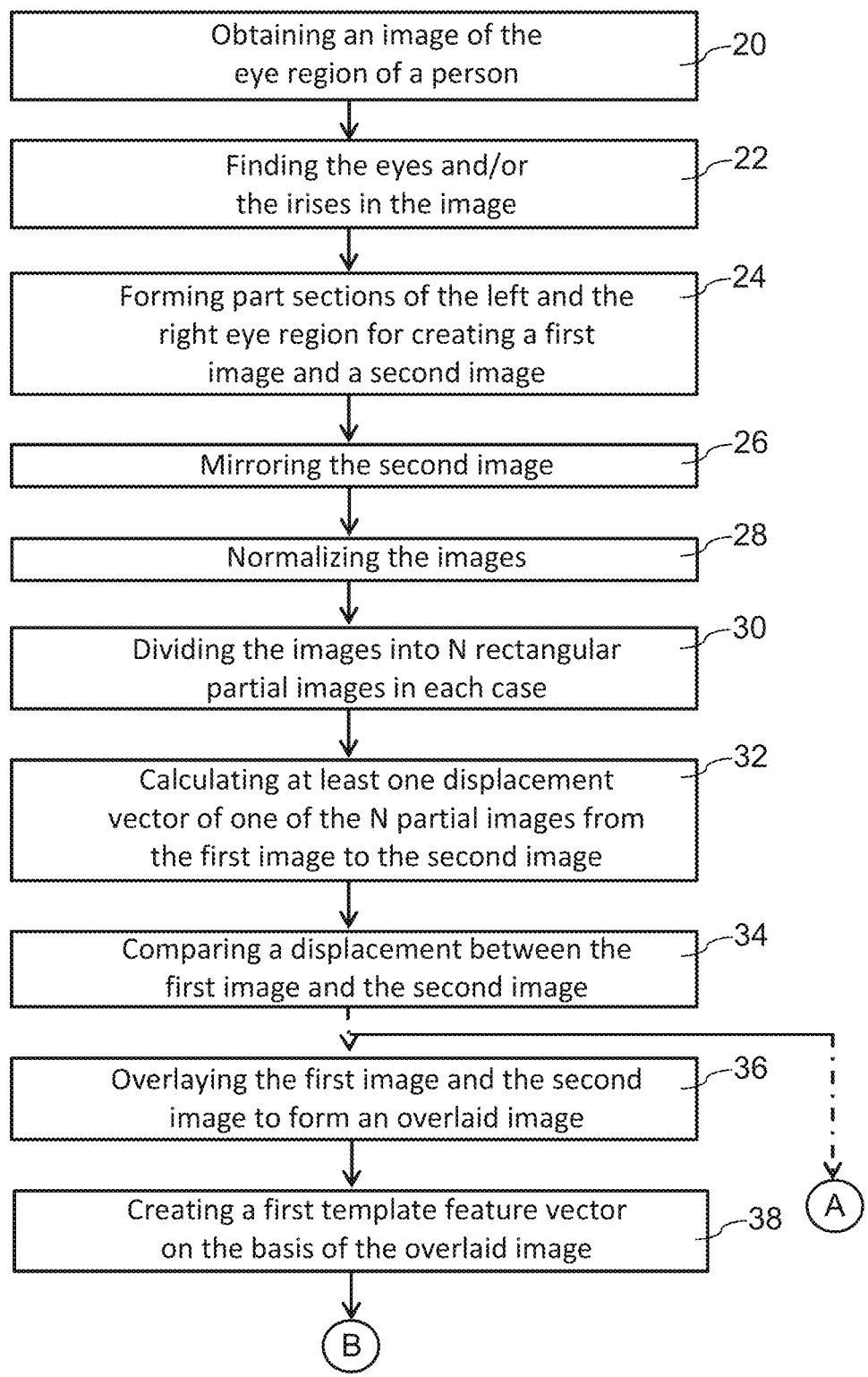
FIG. 2 shows a flow chart of a method for creating biometric data for person recognition according to the example of FIG. 1.

According to a first aspect, which is illustrated in FIG. 2, the corrected images 12', 14" are overlaid in step 36 in the position space, in order to form a combined image 16. The overlaying can be realized for example by averaging each of the pixels of the two corrected images 12', 14". Features for person recognition can be extracted from the combined image 16, wherein the features are used in step 38 to create a first template feature vector of the basis of the overlaid image.

The features can for example relate to horizontal and/or vertical edges, edges which run at a certain angle, for example 45°, to the horizontal, the direction and/or the contrast of various edges and similar features, which are known in principle from the biometric person recognition. The features can for example be extracted by applying a folding filter to the combined image 16, for example using Gabor wavelets, as is known in principle from the prior art. Reference is made to the non-patent literature 3. The determination of the positions and characteristics of the features to be extracted can be performed empirically, analytically or by trial and error.

Other extraction methods can also be applied, for example the recognition of local binary patterns (LBPs); cf. to this end e.g. T. Ojala, M. Pietikäinen, and D. Harwood (1996), "A Comparative Study of Texture Measures with Classification Based on Feature Distributions", Pattern Recognition, vol. 29, pp. 51-59.

The extracted features can be stored in the form of the first template feature vector and later used for person recognition. The storage can take place in the computing device, which carried out the image processing, and/or in a separate database.

Figure 3:
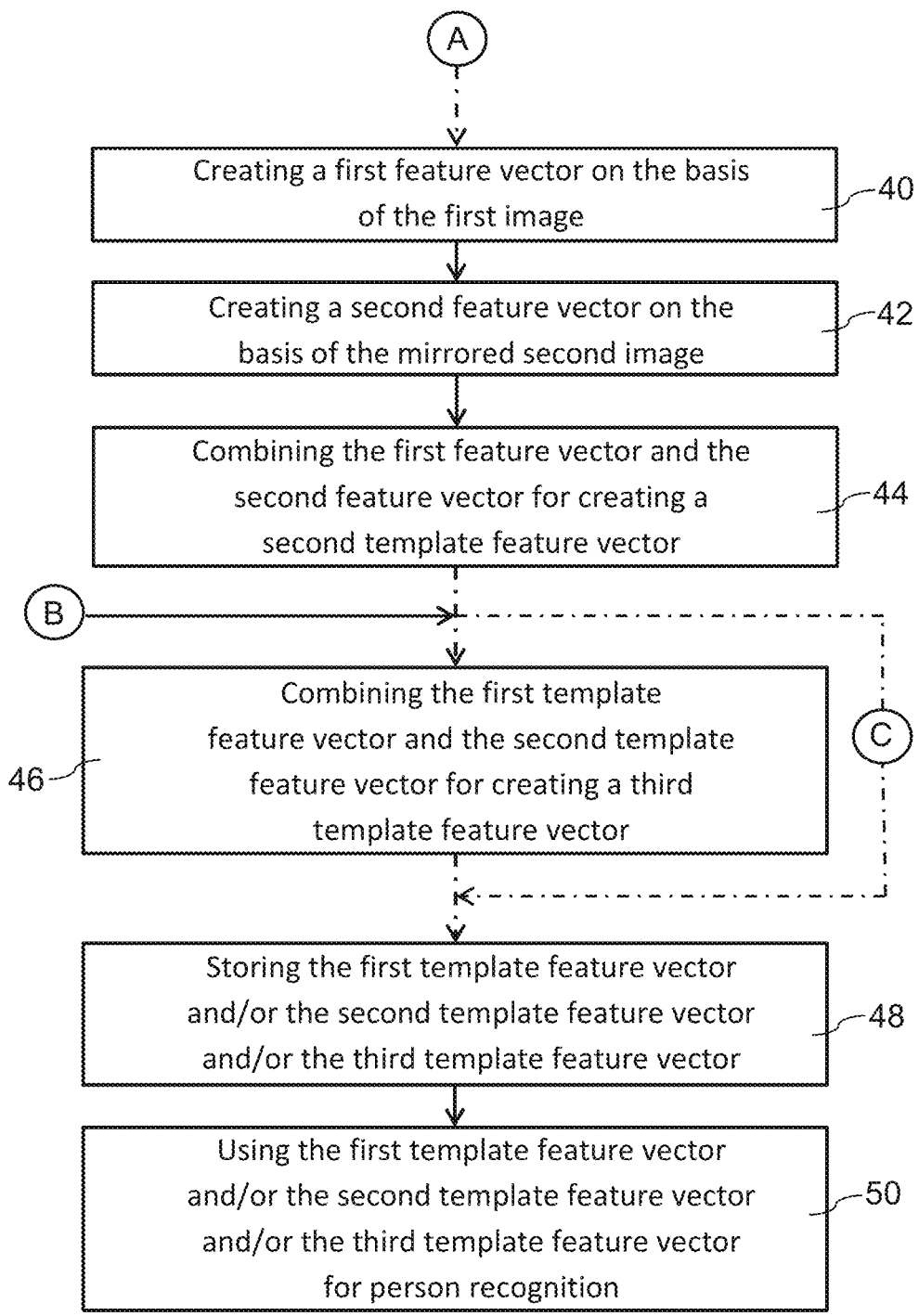
FIG. 3 shows a flow chart of a modification of the method of FIG. 2.

Additionally or alternatively, features can first be extracted from the images 12', 14" in the position space and transformed into the feature space, in order to form feature vectors, which are then combined in the feature space. Feature extraction can in principle proceed exactly as described above in relation to the overlaid image. This may take place at the same positions in the respective images. This alternative is illustrated in FIG. 2 by means of the branch "A", wherein the method is then continued in the flow chart of FIG. 3. At 40 and 42, in each case a first feature vector is created on the basis of the first corrected image 12' of the left eye and a second feature vector is created on the basis of the mirrored and corrected second image 14" of the right eye by means of feature extraction, essentially as described above for the overlaid image 16. The first feature vector and the second feature vector can be combined for creating a second template feature vector, for example by summing the individual vector components or averaging in step 44.

The steps 40 to 44 can be executed alternatively or additionally to the steps 36 and 38. If both a first template feature vector is created in step 38 and a second template feature vector is created in step 44, then the two template feature vectors can be combined in step 46 to form a third template feature vector. If only the alternative of branch "A" with steps 40 to 44 is chosen, then the step 46 of combination can be dispensed with. The same is true if only the branch "B" with steps 36 to 38 is realized. The step 46 of combination can be avoided in branch "C".

Subsequently, the first template feature vector, the second template feature vector and/or the third template feature vector can be stored in step 48. The storage can be performed in the computing device, which carried out the image processing, and/or in a separate database. A feature vector in the sense of the disclosure can also be multi-dimensional and comprise a feature matrix, for example.

The template feature vectors, which have been determined, or a part of the same can be supplied to a classifier or classification method for person recognition. The classification method can proceed in the same or a different computing device and compares a current feature vector with one or more stored template feature vectors.

Classification methods are known in principle. For example, the face of a person can be taken by a camera for person recognition and processed as described above in relation to the template feature vectors, in order to create a current feature vector. The feature extraction can in principle proceed both for creating and storing feature vectors as templates of one or more persons for storage in a database and for creating a current feature vector for person recognition. The current feature vector can be compared with one or more stored template feature vectors. To this end, classification methods are used, for example in accordance with the minimum distance, wherein a difference is formed between the current feature vector and all stored template feature vectors, and the template feature vector with the lowest difference or the lowest distance from the current feature vector "wins". Instead of the difference, the differential amount $\sqrt{(a-b)^2}$ can also be analysed.

Furthermore, in an alternative method, the average distance of the current feature vector from the stored template feature vector can be calculated and compared to a threshold value. According to a further example, a nearest neighbour classifier or a least square fit method can also be used. Cross-correlation methods and SAVD (Sum of Absolute Value of Differences) methods can also be used. These are known in principle to the person skilled in the art and outlined for example in DE 10 2011 054 658 A1. In principle, any desired classifier can be used. The nearest neighbour classifier, support vector machines SVMs, polynomial classifiers and artificial neural networks inter alia are widespread classifiers, to mention only a few examples.

A biometric system comprises components for data recording, preprocessing, feature extraction, classification and reference formation. An example of such a system is shown in FIG. 4. In the above-described example, the data recording can take place by means of a camera, such as a web camera or a camera of a smart device. This is generally termed the sensor 54 of the biometric system. The sensor data are preprocessed, for example normalized, in order to obtain images of the eye region, the features of which should be stored in a database or which should be recognized. The images can be stored in an image database 56 permanently or temporarily. The recorded and, if appropriate, stored images can be processed by means of feature extraction, for example as described above, in order to derive one or more feature vectors or feature matrices 58 for each person, as explained above. This can take place in principle in a data processing system, like a microprocessor or else a workstation or in a distributed data processing structure. The feature vectors or feature matrices can be saved in a reference or template database 60. They can furthermore be supplied to a person recognition process 62, wherein this process also has access to feature vectors or feature matrices in the database 60. The person recognition process 62 can carry out an identification and/or a verification of a person, for example in order to make a decision about access authorization 64. The identification or verification can take place in a classification method.

The templates or template feature groups, e.g. vectors or matrices, can be used for identification/verification or classification. These are used as input data in a classification method and compared with the corresponding reference data or templates. To selectively choose the reference data from the reference database, a user can enter e.g. their personal identification number (PIN) (verification). Alternatively, the reference data can also be stored on a storage medium. In adaptive methods, in the case of a positive classification the evaluation can be used to update the reference data.

FIGS. 5A, 5B and 5C show examples of the images 12', 14' and 16 of FIG. 1 on the basis of real pictures. FIG. 5A shows an image of the left eye region, after it has been normalized, scaled and if appropriate offset or, more generally, after preprocessing. FIG. 5B shows an image of the right eye region, after it has been mirrored, normalized, scaled and if appropriate offset or, more generally, after mirroring and preprocessing. FIG. 5C shows the overlaid periocular image. This image virtually contains an overlay or the average of both eyes and is independent of mirroring. In all three images, features can be extracted at various positions, which are the same for all images, for example by means of folding with Gabor wavelets, in order to extract three feature vectors. The feature vectors can, as described above, be combined, for example in that the average of the feature vectors is formed. The result is a template feature vector, which contains the information of the left eye, the right eye and the overlaid eye, and which is identical for an original image and a mirrored image and therefore is not sensitive to mirroring. As illustrated, instead of a combination of all three feature vectors, one or more template vectors can also be formed directly from the overlaid image or from a combination of the images of the right eye and the left eye.

The method according to the invention was investigated on the basis of a GBU (Good, Bad, Ugly) sample according to the standard developed at the National Institute of Standards and Technology, NIST. The pictures of FIG. 6 explain the three different test scenarios of a GBU sample and are taken from the investigations of NIST. In the example, it is assumed that the images of the upper row are used as reference images and for creating template feature vectors, which can be stored in a database; and the images of the lower row are used for creating current feature vectors, which can be input into the classification method for person recognition. For the GBU sample, the images only differ in terms of exposure and the facial expression, not in terms of head pose, head position or the image section, in order to develop reproducible test criteria. The first (good) image pair on the left side of FIG. 6 corresponds to good lighting conditions and good matching of lighting conditions, environment and facial expression for creating the template feature vector and the current feature vector. The second (bad) image pair in the centre of FIG. 6 corresponds to acceptable lighting conditions, wherein however the lighting conditions and the facial expression for creating the template feature vector and the current feature vector are different. The third (very bad; ugly) image pair on the right side of FIG. 6 corresponds to unfavourable lighting conditions and a poor matching of the lighting conditions, the facial expression and the environment for creating the template feature vector and the current feature vector. For example, the image for creating the template feature vector is dark with little contrast; and the image for creating the current feature vector is illuminated on one side, with strong contrast and gloss. Also, the background is in each case very different with respect to illumination and arrangement, wherein the first image was taken in an indoor space and the second image was taken outdoors.

The GBU test, which was developed at NIST, is performed on the basis of JPEG files, with a resolution of approximately 3008×2000 pixels. The recognition algorithm is set up in such a manner that a false acceptance rate (FAR) of 0.1% is not exceeded. The method according to the invention was tested on this basis and gave recognition rates, which lie considerably above those which were determined by Dr. P. Jonathan Phillips 2010, particularly in the case of unfavourable lighting conditions. Dr. Phillips' test results can be found at https://www.nist.gov/programs-projects/face-and-ocular-challenge-series-focs. They relate to known recognition algorithms for person recognition on the basis of the face and on the basis of the eye region ("periocular recognition")

A corresponding application of the NIST sample to the method of the invention has the following recognition rates at a false acceptance rate of 0.1% gives:

| | Method according to the invention, template based on | | | | | |
|---|---|---|---|---|---|---|
| | Left eye, right eye and overlaid eyes | Left eye and right eye | Only left eye | Only right eye | Only overlaid eyes | NIST results for the periocular recognition |
| NIST recognition rate, Good test scenario | 93.73% | 93.55% | 89.95% | 91.34% | 90.13% | 47% |
| NIST recognition rate; Bad test scenario | 53.27% | 52.81% | 41.29% | 42.40% | 40.83% | 17% |
| NIST recognition rate; Ugly test scenario | 18.34% | 18.16% | 11.80% | 16.22% | 13.46% | 5% |

The method according to the invention for person recognition on the basis of the eye region ("periocular recognition") can be achieved considerably better recognition rates than the known methods. The recognition rates are not only considerably better than the recognition rates proven by NIST, rather they are very close to the results of facial recognition or even exceed the same, namely in the case of the unfavourable (Ugly) test conditions. According to the invention, the recognition rates are achieved on the basis of a template feature vector, which is based on overlaid eyes, as a result of which problems with mirrored pictures are also solved. The additional consideration of a template feature vector on the basis of the left and the right eye can again achieve a considerable increase in the recognition rate. Further the template feature vector on the basis of the overlaid eyes is not redundant, rather the recognition rate can be improved again in relation to the use of the template feature vector on the basis of the left and the right eye. Whilst the improvements to some extent lie in the per thousand or in the lower percent range, these are fully relevant statistically if one considers that person recognition systems are often used over a relatively long time period to investigate many thousand persons, for example on access controls for buildings, systems or at borders.

The invention claimed is:

1. A biometric method, comprising:
    obtaining a first image of a first eye region of a person and a second image of a second eye region of the person, wherein the first eye region contains one of the eyes of the person and the second eye region contains the other eye of the person;
    mirroring the second image;
    dividing each of the non-mirrored first image and the mirrored second image into N partial images, wherein each of the N partial images of one of the first and second images is displaced relative to the N partial images of the other image so that a defined point of each eye region lies in each of the first and second images on the same relative position and that the non-mirrored first image and the mirrored second image become congruent or substantially congruent; and
    combining the non-mirrored first image and the mirrored second image in at least one of the position space and the feature space, in order to create a template of an overlaid image.

2. The method according to claim 1, wherein combining comprises:
    overlaying the non-mirrored first image and the mirrored second image for creating an overlaid image in the position space; and
    processing the overlaid image for creating a first template feature group for person recognition.

3. The method according to claim 2, wherein averages of the pixels of the non-mirrored first image and the mirrored second image are formed for creating the overlaid image.

4. The method according to claim 2, wherein combining comprises:
    processing the non-mirrored first image for creating a first image feature group for person recognition and processing the mirrored second image for creating a second image feature group for person recognition; and
    combining the first image feature group and the second image feature group for creating a second template feature group for person recognition.

5. The method according to claim 4, wherein the first template feature group and the second template feature group are combined to form a third template feature group.

6. The method according to claim 5, wherein the first and second image feature groups are combined by averaging.

7. The method according to claim 4, wherein at least one of the first and second image feature groups is created by processing the first and second images with Gabor wavelets or by extraction of a local binary pattern.

8. The method according to claim 4, wherein at least one of the first and second image feature groups forms a feature vector or a feature matrix.

9. The method according to claim 4, wherein features of the first and second images are extracted at the same positions, in order to form the first and second image feature groups.

10. The method according to claim 4, wherein at least one of the first and second template feature groups is stored in a database.

11. The method according to claim 10, wherein at least one of the first and second template feature groups for person recognition is processed in a classification algorithm, which accesses the database.

12. The method according to claim 1, wherein the non-mirrored first image and the mirrored second image are normalized or compared with regards to the brightness thereof, before overlaying.

13. The method according to claim 1, wherein the first and second images are processed before the mirroring, in order to create sections, which are the same size, of the eye regions which contain the one or the other eye of the person in each case.

14. The method according to claim 1, wherein the first image and the second image are obtained, in that the eyes and the irises of the person are localized on the basis of an image of the face or a part of the face of the person and partial sections, which are the same size, of the left eye region and the right eye region are formed.

15. The method according to claim 1, wherein displacement vectors of the N partial images from one of the first and second images to the other of the first and second images are calculated.

16. The method according to claim 15, wherein the displacement vectors are calculated by cross-correlation or by means of a sequence similarity detection (SSD) algorithm.

17. The method according to claim 1, wherein the first and second images are grayscale images.

18. The method according to claim 1, wherein the first and second images are provided in the form of portable network graphics (PNG) files.

19. The method according to claim 1, wherein a displacement vector field including displacement vectors is calculated between the N partial images of the first image and the N partial images of the second image.

* * * * *